350-96.25 SR
2/27/79 XR 4,141,642

United States Patent [19]

Nagai et al.

[11] 4,141,642

[45] Feb. 27, 1979

[54] OPTICAL FIBER CATHODE RAY TUBES AND COPY MACHINES USING THE SAME

[75] Inventors: Kiyoshi Nagai; Hiroshi Ohashi; Takao Ohiwa, all of Mitaka, Japan

[73] Assignee: Japan Radio Company, Ltd., Tokyo, Japan

[21] Appl. No.: 812,160

[22] Filed: Jul. 1, 1977

[30] Foreign Application Priority Data

Jul. 7, 1976 [JP] Japan .................................. 51-80485

[51] Int. Cl.[2] .............................................. G03B 27/00

[52] U.S. Cl. ...................................... 355/1; 350/96.25; 354/6; 358/244; 358/250

[58] Field of Search ......................... 355/1, 20; 354/6; 350/96.25; 358/901, 244, 250

[56] References Cited

U.S. PATENT DOCUMENTS 3,658,407 4/1972 Kitano et al. ........................ 355/1 X

*Primary Examiner*—Richard A. Wintercorn

*Attorney, Agent, or Firm*—Flynn & Frishauf

[57] ABSTRACT

An improved optical fiber cathode ray tube is provided which enables the recording of images on a recording medium with a high resolution even if the recording medium is disposed with an increased gap between the tube and the recording medium to prevent mechanical contact therebetween. The tube is provided with an additional stack of optical fibers facing the optical fiber face plate of the cathode ray tube with a light transparent thin layer being interposed between the face plate and the additional stack. The transparent thin layer may be a transparent plate and/or air gap. The stack of optical fibers may be in a form of an optical fiber plate or bundle.

11 Claims, 12 Drawing Figures

OPTICAL FIBER CATHODE RAY TUBES AND COPY MACHINES USING THE SAME

BACKGROUND OF THE INVENTION

This invention relates to copy or recording machines as used in the fields of facsimile, electronic computer terminals, various kinds of control systems, and medical equipment, and, in particular, to fiber-optic, or optical fiber, cathode ray tubes used in such copy machines.

One known copy machine comprises, as schematically shown in FIG. 1, a flying spot tube 1, an optical system including a spherical lens 3 and a photosensitive medium 4. The image 2 displayed on the face plate of the flying spot tube 1 is recorded on the photosensitive medium 4 through the optical system to provide a hard copy.

This system has disadvantages that the brightness of the image is remarkably reduced by the use of the optical system, that a high-resolution of the flying spot tube is required for a clear record, that a lengthy optical path is required for the optical system and that the optical system is weak to mechanical vibration.

Another known copy machine is one using an optical fiber cathode ray tube (CRT).

The known optical fiber CRT 6 is, as shown in FIGS. 2(*a*)–2(*c*), a type of cathode ray tube having an electron gun 61 and a face plate 62. The optical fiber CRT 6 is characterized in that the face plate 62 is a stack of glass fibers. The stack consists of a large number of parallel glass fibers of small diameter each of which is sheathed with a glass having a lower refractive index than that of the fiber glass. The fiber ends form the inner and the outer surfaces of the face plate. The phosphor is deposited on the inner surface of the face plate.

Referring to FIG. 3 in which the construction of the known optical fiber CRT is schematically shown, an electron beam 7 is emitted from the electron gun 61 and the phosphor 8 is thereby bombarded and excited to illuminate. The luminous light is emitted from the fibers 9 of the optical fiber face plate 62. The spreading of the emitted light beam 10 depends on the distance from the face plate 62 and the numerical aperture of the face plate.

At the outer surface of the face plate 62, an increased brightness of about 100 times in comparison with the use of the optical system as shown in FIG. 1 and a high resolution are obtained, but they become reduced at a distance from the outer surface of the face plate.

Accordingly, in a copy machine using the optical fiber CRT, the photosensitive medium 11 must be disposed not apart from the face plate 62 as shown in FIG. 3 but in direct contact with the face plate as shown in FIG. 4.

Referring to FIG. 4, an electrographic paper 12 as a photosensitive medium is pressed onto the face plate 62 of the optical fiber CRT 6 by a pressure roll 13.

On the other hand, not only electrographic papers such as electrofaxes and dry graphic papers such as dry silver photographic papers but also CdS coated drums and Se (selenium) coated drums are used as a photosensitive medium. In copy machine using plain paper a, CdS or Se coated drum is used for a photosensitive medium.

But the CdS coating and the Se coating are very weak and are readily injured by friction and mechanical engagement with an object.

Therefore, the optical fiber CRT has not been used in copy machines using CdS or Se coated drum as a photosensitive medium.

SUMMARY OF THE INVENTION

An object of this invention is to provide a CRT which enables the recording of images on a photosensitive medium with a high resolution and a high brightness, the medium being disposed with a gap from the CRT.

Another object of this invention is to provide an improved optical fiber CRT for achieving the above object with a simple construction.

Still another object is to provide a copy machine wherein freedom is afforded to the relative arrangement between the CRT and the photosensitive medium, whereby the photosensitive medium is disposed out of contact with the CRT.

According to this invention, above objects are realized by combining or assembling additional members with a conventional optical fiber CRT.

According to one aspect of this invention, an optical fiber CRT is characterized in that an additional stack of optical fibers is provided in front of the optical fiber face plate of the CRT with an air gap therebetween which air gap may be selected 0.1–0.2mm in thickness. Instead of the air gap, a light transparent plate of glass, ceramics, and/or organic resin may be used.

The additional stack of optical fibers comprises a large number of parallel optical fibers of small diameter, each of the optical fibers being sheathed by a lower refractive index material than the optical fiber and the fiber ends forming a surface facing said face plate and an opposite end. The additional stack may be a long optical fiber bundle.

The spreading of a light beam emitted from the improved optical fiber CRT is reduced in comparison with the conventional optical fiber CRT. Therefore the improved tubes permit a gap to be provided between a light emitting end surface and a recording or photosensitive medium without deterioration of image resolution. Accordingly, a copy machine is provided by this invention wherein the photosensitive medium is disposed out of contact with the optical fiber CRT.

Further objects and features of this invention will be understood from following descriptions in connection with embodiments of this invention with reference to the annexed drawings.

DETAILED DESCRIPTION OF PREFERRED EMBODIMENTS

Figure 1:
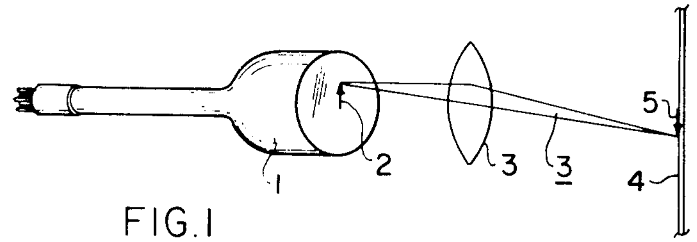
FIG. 1 PRIOR ART
FIG. 1 schematically shows a diagrammatical view of a known copy machine.
Figure 2A:
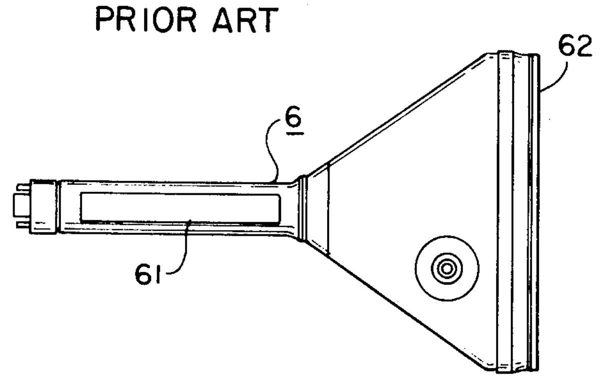
FIG. 2(a) PRIOR ART
FIGS. 2(*a*)–2(*c*) show different views of a known optical fiber CRT.
Figure 2B:
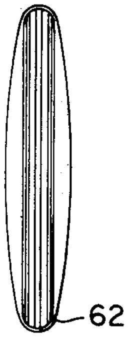
FIG. 2(b) PRIOR ART
Figure 2C:
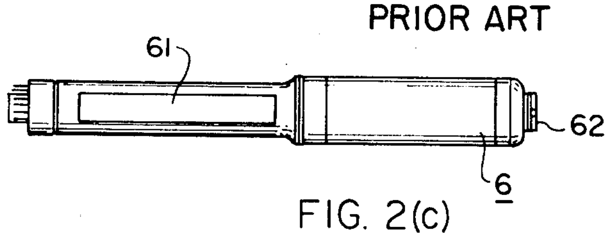
FIG. 2(c) PRIOR ART
Figure 3:
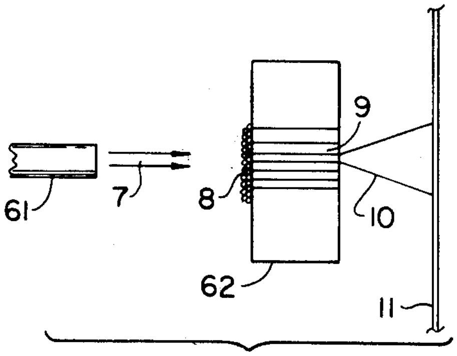
FIG. 3 PRIOR ART
FIG. 3 schematically shows a diagrammatical view of the known optical fiber CRT.
Figure 5:
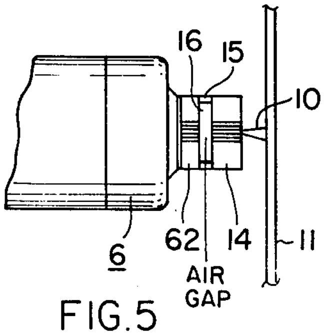
FIG. 5 shows a partial side view of an embodiment of optical fiber CRTs according to this invention, FIG. 6 graphically shows a variation of the emitted light beam diameter of the embodiment in FIG. 5, FIGS. 7(*a*) and 7(*b*) show partial side views of different modified embodiments of the invention, and FIGS. 8 and 9 schematically show different embodiments of copy machines using the CRTs shown in FIGS. 5 and 7(*b*), respectively.
Figure 4:
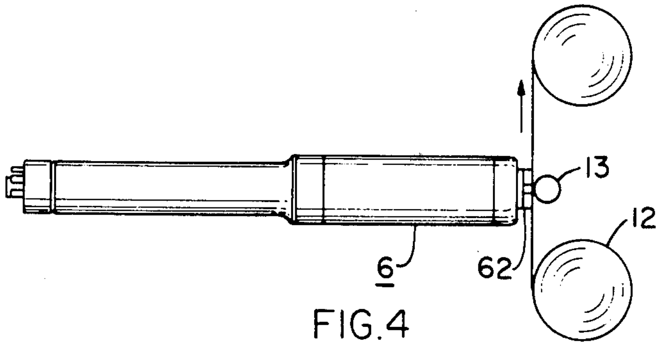
FIG. 4 PRIOR ART
FIG. 4 shows a side view of a known copy machine using the conventional optical fiber CRT, which is simplified for illustrating only the relative arrangement between the CRT and the recording medium.

Referring to FIG. 5, which shows a partial side view of an embodiment of the fiber CRT of this invention, the embodiment is characterized in that a stack of optical fibers 14 is additionally provided in front of the face plate 62 of the known optical fiber CRT which was described in reference to FIGS. 2 and 3. An air gap 16 is provided between the additional stack 14 and the face plate 62 by interposing two spacers 15 therebetween at peripheral positions of the air gap.

More than two spacers may be interposed. Furthermore, a circumferential endless spacer member may be used.

The additional optical fiber stack 14 comprises a large number of parallel optical fibers, each of which is sheathed by a glass having a lower refractive index than that of the fiber glass, the fiber ends forming a surface facing the face plate 62 and an opposite surface.

The light beam emitted from the face plate 62 passes through the air gap 16 and the additional stack 14 and is emitted from the stack 14. The light beam 10 is projected with a reduced beam diameter onto a recording medium 11 which is disposed spaced apart from the additional stack 14.

Figure 6:
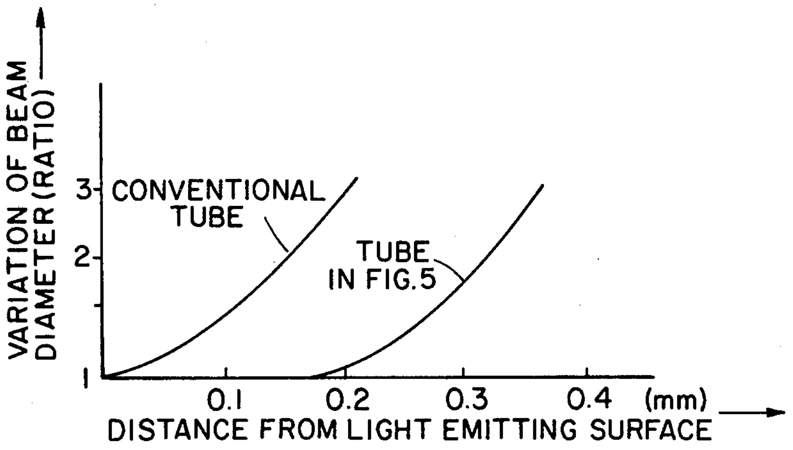

The variation of the emitted beam diameter to a distance from the additional 14 stack is graphically shown in FIG. 6. The variation was measured by the two slit method using a photomultiplier tube to measure the variation of half-amplitude width of the light beam. For the comparison, the beam diameter variation to distance from the face plate of the conventional optical fiber CRT is also shown in FIG. 6.

It will be noted from FIG. 6 that the optical fiber CRT with the additional stack 14 provides images at a distance from the CRT or, in detail, the additional stack (14, FIG. 5), with a high resolution and a high brightness.

The thickness of the spacer 15 and, therefore, of the air gap 16 is preferably selected 0.1–0.2mm.

Figure 7A:
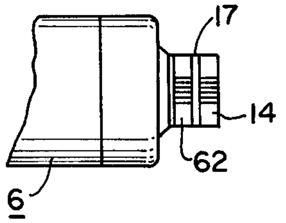
Figure 7B:
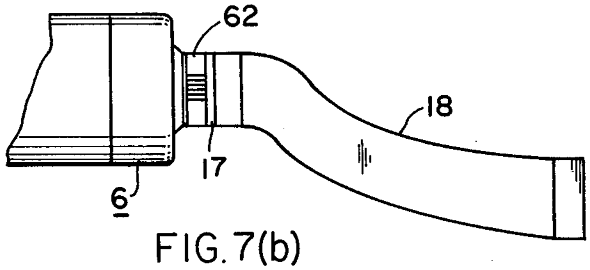

The air gap 16 may be replaced by a light transparent thin plate 17, as shown in FIGS. 7(*a*) and 7(*b*), which may be of a glass plate, heat-resistant organic resin film or a ceramic plate, or of a laminated plate thereof. The thickness of the plate is determined according to the refractive index. The greater the refractive index of the plate is, the thicker the plate is formed. In case the plate is of glass, organic resin or ceramics, the thickness of the plate may be preferably selected 0.1–1mm.

As heat-resistant organic resins polyamide and polyimide may be preferably used.

The additional stack 14 may be in a form of a long optical fiber bundle, such as shown by 18 in FIG. 7(*b*).

Since the optical fiber CRTs 6 with the additional stack shown in FIGS. 5, 7(*a*) and 7(*b*) provide images at a distance from the additional stack with a high resolution and a high brightness, these may be used as a recording means in copy machines employing a mechanically weak photosensitive medium such as a Se coating and a CdS coating.

Figure 8:
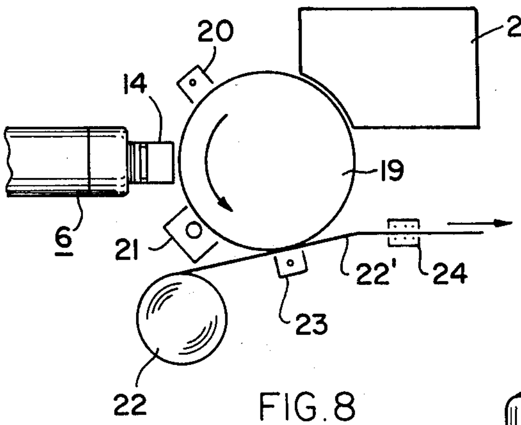

FIG. 8 schematically shows an embodiment of a copy machine using the optical fiber CRT with the additional stack 14 as shown in FIG. 5. Referring to FIG. 8, a charger 20, the optical fiber CRT 6, a developer 21, a charger for toner transfer 23 and cleaner 25 are disposed around a Se coated or a CdS coated drum 16 in this order with angular spaces with one another in a rotational direction of the drum 19, with a paper 22 being fed between the drum 19 and the charger 23 at which the toner is transferred onto the paper 22, similarly as in a conventional copy machine. The toner transferred paper 22' then passes through a fixer 24 to be fixed by pressing or heating.

In the copy machine of the present invention, the Se or CdS coated drum is not in contact with the CRT and, therefore, is not injured, because the optical fiber CRT in FIG. 5 provides an image at a distance from the CRT with a high resolution and a high brightness. In this copy machine, an image resolution of six lines per one millimeter (6 lines/1mm) was realized in the case of affording a gap of 500 μm between the improved optical fiber CRT 6 and the drum 19. But, in using a conventional optical fiber CRT with a gap of 100 μm from the drum 19, an image resolution of only four lines per one millimeter (4 lines/1mm) was obtained.

Figure 9:
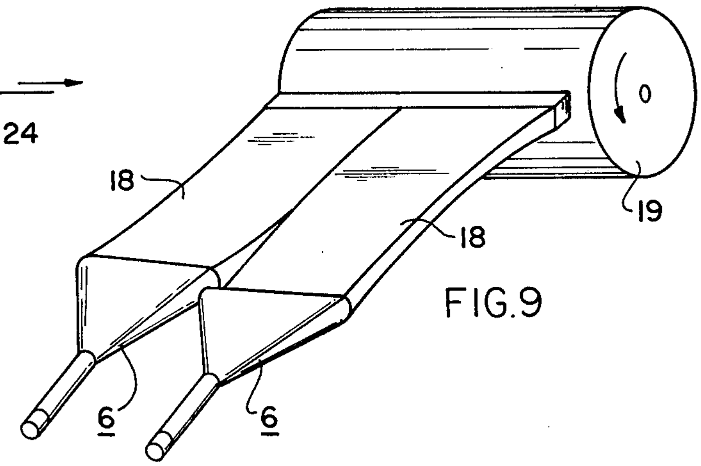

According to the embodiment using an optical fiber bundle as shown in FIG. 7(*b*), images from two or more CRTs can be recorded onto a wider recording medium by collecting together emitting ends of fiber bundles provided to respective CRTs and by disposing the collected end surface adjacent to the medium. An example is shown in FIG. 9, in which, two optical fiber CRTs 6, and, therefore, two fiber bundles 18 are used, the two fiber bundles 18 being collected together at the emitting ends and disposed adjacent to the wider drum 19.

As above described, the conventional optical fiber CRT must be disposed in close contact with, for example, with a gap of 0.1mm or less, a recording medium. But, according to this invention, the recording medium can be disposed with an increased gap from the light emitting surface of the CRT, the gap being sufficient to prevent the medium from being injured by the friction or the engagement therebetween, without deterioration of the image resolution.

What is claimed:

1. In an optical fiber cathode ray tube having an optical fiber stack face plate comprising a large number of parallel glass fibers of small diameter, the fiber ends forming the inner and outer surfaces of the face plate.

the improvement comprising an additional stack of optical fibers which is disposed facing said face plate of said cathode ray tube, with a light transparent thin layer being interposed between said face plate and said additional stack, said additional stack comprising a large number of parallel optical fibers of small diameter, each of the optical fibers being sheathed by a lower refractive material than the optical fiber, and the fiber ends forming a surface facing said face plate and a surface facing an opposite end.

2. The improvement as claimed in claim 1, wherein said light transparent thin layer comprises an air gap of from about 0.1 to about 0.2mm in thickness.

3. The improvement as claimed in claim 1, wherein said light transparent thin layer comprises a light transparent plate.

4. The improvement as claimed in claim 3, wherein said light transparent plate comprises at least one layer of at least one of glass, ceramic and heat-resistant organic resin.

5. The improvement as claimed in claim 4, wherein said organic resin is one of polyamide and polyimide.

6. In a copy machine comprising a cathode ray tube and a photosensitive medium which is movably disposed facing a face plate of the cathode ray tube, said cathode ray tube having an optical fiber stack face plate comprising a large number of parallel glass fibers of small diameter, the fiber ends forming the inner and outer surfaces of the face plate, the improvement comprising an additional stack of optical fibers provided between said face plate and said photosensitive medium, said additional stack comprising a large number of parallel optical fibers of small diameter, each of the optical fibers being sheathed by a lower refractive material than the optical fiber, the fiber ends forming opposite surfaces of said additional stack, one of said opposite surfaces facing said face plate with a light transparent thin layer therebetween, and the other of said opposite surfaces facing said photosensitive medium with an air gap therebetween to prevent said photosensitive medium from engaging with said additional stack.

7. The improvement as claimed in claim 6, wherein said additional stack of optical fibers comprises a lengthy optical bundle.

8. The improvement as claimed in claim 6, wherein said light transparent thin layer comprises an air gap of from about 0.1 to about 0.2mm in thickness.

9. The improvement as claimed in claim 6, wherein said light transparent thin layer comprises a light transparent plate.

10. The improvement as claimed in claim 9, wherein said light transparent plate comprises at least one layer of at least one of glass, ceramic and heat-resistant organic resin.

11. The improvement as claimed in claim 10, wherein said organic resin is one of polyamide and polyimide.

* * * * *